(12) United States Patent
Xiao et al.

(10) Patent No.: US 9,104,528 B2
(45) Date of Patent: Aug. 11, 2015

(54) CONTROLLING THE RELEASE OF PRIVATE INFORMATION USING STATIC FLOW ANALYSIS

(75) Inventors: Xusheng Xiao, Raleigh, NC (US); Nikolai Tillmann, Redmond, WA (US); Manuel A. Fahndrich, Seattle, WA (US); Jonathan Paul de Halleux, Seattle, WA (US); Michal J. Moskal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 13/314,212

(22) Filed: Dec. 8, 2011

(65) Prior Publication Data

US 2013/0152154 A1 Jun. 13, 2013

(51) Int. Cl.
*G06F 17/00* (2006.01)
*H04L 29/06* (2006.01)
*G06F 21/00* (2013.01)

(52) U.S. Cl.
CPC ............... *G06F 17/00* (2013.01); *G06F 21/00* (2013.01)

(58) Field of Classification Search
USPC .......................................................... 726/1
See application file for complete search history.

(56) References Cited

U.S. PATENT DOCUMENTS

| | | | |
|---|---|---|---|
| 5,128,672 A | 7/1992 | Kaehler | |
| 6,724,370 B2 | 4/2004 | Dutta et al. | |
| 7,479,949 B2 | 1/2009 | Jobs et al. | |
| 7,877,780 B2 * | 1/2011 | Kolawa et al. | 726/1 |
| 8,386,960 B1 | 2/2013 | Eismann et al. | |
| 2004/0243977 A1 | 12/2004 | Shou et al. | |
| 2007/0266420 A1 | 11/2007 | Hawkins et al. | |
| 2008/0320438 A1 | 12/2008 | Funto et al. | |
| 2009/0007223 A1 * | 1/2009 | Centonze et al. | 726/1 |
| 2009/0313597 A1 | 12/2009 | Rathbone et al. | |
| 2010/0259561 A1 | 10/2010 | Forutanpour et al. | |
| 2010/0302212 A1 | 12/2010 | Weber et al. | |
| 2011/0047594 A1 * | 2/2011 | Mahaffey et al. | 726/1 |
| 2011/0074692 A1 | 3/2011 | Causey et al. | |
| 2011/0087990 A1 | 4/2011 | Ng et al. | |
| 2011/0145918 A1 | 6/2011 | Jung et al. | |
| 2012/0167162 A1 * | 6/2012 | Raleigh et al. | 726/1 |

OTHER PUBLICATIONS

Xinwen Zhang; Securing Elastic Applications on Mobile Devices for Cloud Computing; Year: 2009; ACM; pp. 1-8.*

(Continued)

*Primary Examiner* — Monjour Rahim
(74) *Attorney, Agent, or Firm* — Sandy Swain; Judy Yee; Mickey Minhas

(57) ABSTRACT

A privacy control system is described herein for controlling dissemination of private information by a program. The privacy control system operates by performing static analysis to determine at least one flow within the program of private information, from a source to a sink. The static analysis is particularly configured to identify two types of flow, including: (a) an unvetted flow of untampered private information from the source to the sink; and (b) a flow of tampered private information from the source to the sink, whether vetted or unvetted. The privacy control system then prompts the user to provide a privacy control decision regarding the flow. The privacy control decision governs whether actual data or anonymized data is provided to the sink, or whether the program is terminated. A runtime system then runs the program in accordance with the privacy control decision.

17 Claims, 11 Drawing Sheets

(56) References Cited

OTHER PUBLICATIONS

Beresford, et al., "MockDroid: trading privacy for application functionality on smartphones," retrieved at <<http://www.cl.cam.ac.uk/~acr31/pubs/beresford-mockdroid.pdf>>, HotMobile '11, 12th Workshop on Mobile Computing Systems and Applications, Mar. 2011, 6 pages.

Reddy, et al., "Application-centric security policies on unmodified Android," retrieved at <<http://www.cs.umd.edu/~jfoster/papers/UCLA-TR-110017.pdf>>, UCLA Technical Report No. 110017, UCLA, Jul. 5, 2011, 10 pages.

Egele, et al., "PiOS: Detecting Privacy Leaks in iOS Applications," retrieved at <<http://iseclab.org/papers/egele-ndss11.pdf>>, 18th Annual Network & Distributed System Security Symposium, Feb. 2011, 15 pages.

Zhou, et al., "Taming Information-Stealing Smartphone Applications (on Android)," retrieved at <<http://www.csc.ncsu.edu/faculty/jiang/pubs/TRUST11.pdf>>, Proceedings of the 4th International Conference on Trust and Trustworthy Computing, Jun. 2011, 15 pages.

Besson, et al., "A Formal Model of Access Control for Mobile Interactive Devices," retrieved at <<http://www.irisa.fr/celtique/fbesson/access_control_mobile_devices.pdf>>, 11th European Symposium on Research in Computer Security, Sep. 2006, pp. 1-19.

Android product homepage, retrieved at <<http://www.android.com/>>, retrieved Sep. 2011, Google Inc., Mountain View, CA, 1 page.

Facebook service homepage, retrieved at <<http://www.facebook.com/>>, retrieved on Sep. 9, 2011, Facebook, Inc., Palo Alto, CA, 1 page.

iOS product homepage, retrieved at <<http://www.apple.com/ios/>>, retrieved Sep. 2011, Apple Inc., Cupertino, CA, 8 pages.

"Minesweeper," retrieved at <<http://en.wikipedia.org/wiki/Minesweeper>>, retrieved on Sep. 8, 2011, Wikipedia online encyclopedia entry, 1 page.

TouchDevelop research homepage, retrieved at <<http://research.microsoft.com/en-us/projects/touchdevelop/>>, retrieved Sep. 2011, Microsoft Research, Microsoft Corporation, Redmond, WA, 12 pages.

TouchDevelop product homepage, retrieved at <<http://www.touchdevelop.com/>>, retrieved on Sep. 8, 2011, Microsoft Research, Microsoft Corporation, Redmond, WA, 9 pages.

Windows Phone homepage, retrieved at <<http://www.microsoft.com/windowsphone/en-us/ie6.aspx>>, retrieved Sep. 2011, Microsoft Corporation, Redmond, WA, 2 pages.

Chandra, et al., "Fine-grained Information Flow Analysis and Enforcement in a Java Virtual Machine," retrieved at <<http://www.acsa-admin.org/2007/papers/173.pdf>>, Twenty-Third Annual Computer Security Applications Conference (ACSAC), Dec. 2007, 12 pages.

Denning, Dorothy E., "A Lattice Model of Secure Information Flow," retrieved at <<http://spy.scienze.univr.it/papers/Isa-orig/Sicurezza/InformationFlows/lattice76.pdf>>, Communications of the ACM, vol. 19, Issue 5, May 1976, pp. 236-243.

Denning, et al., "Certification of Programs for Secure Information Flow," retrieved at <<http://www.cs.cornell.edu/andru/cs711/2003fa/reading/denning77.pdf>>, Communications of the ACM, vol. 20, Issue 7, Jul. 1977, pp. 504-513.

Enck, et al., "TaintDroid: An Information-flow Tracking System for Realtime Privacy Monitoring on Smartphones," retrieved at <<http://152.3.140.5/~lpcox/enck-osdi10.pdf>>, Proceeding of the USENIX Symposium on Operating Systems Design and Implementation (OSDI), Oct. 2010, 1-15 pages.

Felt, et al., "The Effectiveness of Application Permissions," retrieved at <<http://www.usenix.org/events/webapps11/tech/final_files/Felt.pdf, Proceedings of the 2nd USENIX Conference on Web Application Development (WebApps), Jun. 2011, 12 pages.

Ferrante, et al., "The Program Dependence Graph and its use in Optimization," retrieved at <<http://citeseerx.ist.psu.edu/viewdoc/download?doi=10.1.1.116.2864&rep=rep1&type=pdf>>, ACM Transactions on Programming Languages and Systems (TOPLAS), vol. 9, No. 3, Jul. 1987, pp. 319-349.

Gilbert, et al., "Vision: Automated Security Validation of Mobile Apps at App Markets," retrieved at <<http://appanalysis.org/jjung/jaeyeon-pub/appvalidation.pdf>>, Proceedings of the Second International Workshop on Mobile Cloud Computing and Services, Jun. 2011, 5 pages.

Heintze, et al., "The SLam Calculus: Programming with Secrecy and Integrity," retrieved at <<http://citeseerx.ist.psu.edu/viewdoc/download?doi=10.1.1.173.3936&rep=rep1&type=pdf>>, Proceedings of the 25th ACM SIGPLAN-SIGACT Symposium on Principles of Programming Languages, 1998, 13 pages.

King, James C., "Symbolic Execution and Program Testing," retrieved at <<http://www.cs.uiuc.edu/class/sp11/cs477/king76symbolicexecution.pdf>>, Communications of the ACM, vol. 19, No. 7, Jul. 1976, pp. 385-394.

"What is user Account Control?," retrieved at <<http://windows.microsoft.com/en-US/windows-vista/What-is-User-Account-Control>>, retrieved Sep. 2011, Microsoft Windows®, Microsoft Corporation, Redmond, WA, 4 pages.

Motiee, et al., "Do Windows users Follow the Principle of Least Privilege?: Investigating user Account Control Practices," retrieved at <<http://lersse-dl.ece.ubc.ca/record/237/files/soups_article.pdf>>, Proceedings of the Sixth Symposium on Usable Privacy and Security, SOUPS, 2010, 13 pages.

Myers, Andrew C., "JFlow: Practical Mostly-static Information Flow Control," retrieved at <<http://www.utdallas.edu/~hamlen/Papers/myers99.pdf>>, Proceedings of the 26th ACM Symposium on Principles of Programming Languages (POPL), Jan. 1999, 17 pages.

Myers, et al., "Protecting Privacy using the Decentralized Label Model," retrieved at <<http://citeseerx.ist.psu.edu/viewdoc/download?doi=10.1.1.126.2197&rep=rep1&type=pdf>>, ACM Transactions on Software Engineering and Methodology (TOSEM), vol. 9, No. 4, Oct. 2000, pp. 410-442.

Roy, et al., "Laminar: Practical Fine-grained Decentralized Information Flow Control," retrieved at <<https://www.cs.utexas.edu/~indrajit/pubs/pldi161-roy.pdf>>, ACM SIGPLAN Conference on Programming Language Design and Implementation, vol. 44, No. 6, May 28, 2009, 12 pages.

Sabelfeld, et al., "Language-based Information-flow Security," retrieved at <<http://www.google.co.in/url?q=http://citeseerx.ist.psu.edu/viewdoc/download%3Fdoi%3D10.1.1.19.4873%26rep%3Drep1%26type%3Dps&sa=U&ei=gHNoTuXEDsb5rAe9lpzwCg&ved=0CBYQFjAA&usg=AFQjCNEWdcPoixFq3p_2VC1-2fqaL5-6tQ>>, IEEE Journal on Selected Areas in Communications, 2002, 15 pages.

Saltzer, et al., "The Protection of Information in Computer Systems," retrieved at <<http://ieeexplore.ieee.org/stamp/stamp.jsp?arnumber=01451869>>, Proceedings of the IEEE, vol. 63, No. 9, Sep. 1975, pp. 1278-1308.

Tillmann, et al., "TouchStudio—Programming Cloud-connected Mobile Devices via Touchscreen," retrieved at <<http://research.microsoft.com/en-us/um/people/moskal/pdf/touchstudio.pdf>>, Microsoft Technical Report No. MSR-TR-2011-49, Microsoft Corporation, Redmond, WA, Apr. 15, 2011, 20 pages.

Vidas, et al., "Curbing Android Permission Creep," retrieved at <<http://w2spconf.com/2011/papers/curbingPermissionCreep.pdf>>, Proceedings of the Web 2.0 Security and Privacy 2011 Workshop (W2SP 2011), May 2011, 5 pages.

Wetherall, et al., "Privacy Revelations for Web and Mobile Apps," retrieved at <<http://www.usenix.org/event/hotos11/tech/final_files/Wetherall.pdf>>, Proceedings of the 13th USENIX Conference on Hot Topics in Operating Systems, HotOS, May 10, 2011, 5 pages.

Xie, et al., "Static Detection of Security Vulnerabilities in Scripting Languages," retrieved at <<http://www.usenix.org/event/sec06/tech/full_papers/xie/xie.pdf>>, Proceedings of the 15th conference on USENIX Security Symposium, vol. 15, 2006, pp. 179-192.

Yee, Ka-Ping, "Aligning Security and Usability", retrieved at <<http://citeseerx.ist.psu.edu/viewdoc/download?doi=10.1.1.70.6097&rep=rep1&type=pdf>>, IEEE Security and Privacy, vol. 2, No. 5, Sep.-Oct. 2004, pp. 48-55.

Zhu, et al., "TaintEraser: Protecting Sensitive Data Leaks using Application-level Taint Tracking," retrieved at <<http://appanalysis.org/privacyscope/osr_tainteraser.pdf>>, ACM SIGOPS Operating Systems Review, Jan. 2011, 13 pages.

(56) References Cited

OTHER PUBLICATIONS

U.S. Appl. No. 13/217,306, filed Aug. 25, 2011, entitled "Dynamically Changing Key Selection Based on Context," de Halleux, et al., 25 pages.
Hoglund, et al., "Exploiting Software: How to Break Code," retrieved at <<http://exploitingsoftware.com/book/>>, retrieved on Dec. 7, 2011, Addison-Wesley Professional, Feb. 27, 2004, table of contents only, 3 pages.
Xiao, et al., "Transparent Privacy Control via Static Information Flow Analysis," retrieved at <<http://research.microsoft.com/apps/pubs/default.aspx?id=152507>>, Microsoft Research Technical Report No. MSR-TR-2011-93, Microsoft Corporation, Redmond, WA, Aug. 2011, 23 pages.
Maloney, et al., "The Scratch Programming Language and Environment," retrieved at <<http://web.media.mit.edu/~jmaloney/papers/ScratchLangAndEnvironment.pdf>>, ACM Transactions on Computing Education, vol. 10, No. 4, Article 16, Published Nov. 2010, pp. 16:1-16:15.
Nickerson, Jeffery, V., "Visual Programming," retrieved at http://www.stevens.edu/jnickerson/indextype.htm, PhD thesis, New York University, 1994, pp. 1-235.
Repenning, et al., "Tactile Programming: A Unified Manipulation Paradigm Supporting Program Comprehension, Composition and Sharing," retrieved at http://www.cs.colorado.edu/~ralex/papers/PDF/VL96.pdf, in Proceedings of Visual Languages 1996, IEEE Computer Society, Boulder, Colorado, 1996, 9 pages.
Teitelbaum, et al., "The Cornell Program Synthesizer: a Syntax-Directed Programming Environment," retrieved at <<http://acm.org>>, Communications of the ACM, vol. 24, No. 9, 1981, pp. 563-573.
Ward, et al., "Dasher—A Data Entry Interface Using Continuous Gestures and Language Models," retrieved at <<http://acm.org>>, Proceedings of the 13th Annual ACM Symposium on User interface Software and Technology, 2000, pp. 129-137.
"TouchStudio," retrieved at <<https://web.archive.org/web/20111126203507/http://research.microsoft.com/en-us/projects/touchstudio/>>, Microsoft Research, Microsoft Corporation, Redmond, WA, archived date of Nov. 26, 2011, 1 page.
"Integrated Development Environment," retrieved at <<https://web.archive.org/web/20111108223509lhttp://en.wikipedia.org/wiki/Integrated_development_environment>>, Wikipedia encyclopedia entry, archived date of Nov. 8, 2011, 5 pages.
Himberg, et al., "On-line Personalization of a Touch Screen Based Keyboard," retrieved at <<http://dl.acm.org/citation.cfm?id=604061, Proceedings of the 8th International Conference on Intelligent User Interfaces, Jan. 2003, 8 pages.
Selker, et al., "Context-aware Design and Interaction in Computer Systems," retrieved at <<http://dl.acm.org/citation.cfm?id=1011450>>, Journal of IBM Systems, vol. 39, Nos. 3 & 4, Jul. 2000, pp. 880-891.
Burckhardt, et al., "Semantics of Concurrent Revisions," retrieved at <<http://research.microsoft.com/.pubs/135386/companion-tr-7-15.pdf>>, Microsoft Technical Report No. MSR-TR-2010-94, Microsoft Corporation, Redmond, WA, Jul. 2010, 14 pages.
Cooper, Stephen, "The Design of Alice," retrieved at <<http://web.stanford.edu/~coopers/alice/a15-cooper.pdf>>, ACM Transactions on Computing Education, vol. 10, Issue 4, Nov. 2010, pp. 15:1-15:16.
Edwards, et al., "Experiences Using Tablet PCs in a Programming Laboratory," retrieved at <<http://people.cs.vt.edu/~edwards/downloads/170-Edwards.pdf>>, In Proceedings of SIGITE '04, Oct. 28-30, 2004, 5 pages.
Garlan, et al., "Gnome: An Introductory Programming Environment Based on a Family of Structure Editors," retrieved at <<http://dl.acm.org/citation.cfm?id=390010.808250>>, Proceedings of the First ACm SIGSOFT/SIGPLAN Software Engineering Symposium on Practical Software Development Environments, Apr. 1984, pp. 65-72.
Kelleher, et al., "Lowering the Barriers to Programming: A Taxonomy of Programming Environments and Languages for Novice Programmers," retrieved at <<http://citeseerx.ist.psu.edu/viewdoc/download?doi=10.1.1.224.5712&rep=rep1&type=pdf>>, ACM Computing Surveys, vol. 37, Issue 2, Jun. 2005, pp. 83-137.
Kolling, Michael, "The Greenfoot Programming Environment," retrieved at <<http://kar.kent.ac.uk/30614/1/2010-11-TOCE-greenfoot.pdf>>, ACM Transactions on Computing Education, vol. 10, No. 4, Article 14, Publication Date: Nov. 2010, pp. 14:1-14:21.

\* cited by examiner

```
1    action foo() : Nothing {
2        var s := "unclassified";
3        var p := media → create picture();
4        var r := senses → current location; // classified
5        s := r → describe(); // classified
6        p → draw text(s); // p's mutable state is classified
7        p → share("facebook");
8    }
```

```
1   action foo(msg : Message, msgs: MessageCollection, i: Number) : Nothing {
2       pic := senses → take camera picture;
3       pic → share('facebook','share a pic');
4       s := bar();
5       msgs → add(msg);
6       msg → set message(s);
7       msg2 := msgs → at(i);
8       msg2 → share('facebook');
9       y := false;
10      if s → contains('Seattle') then {
11          y := true;
12      }
13  }
14
15  action bar() returns r : String {
16      l := senses → current location;
17      r := locations → describe location(l);
18  }
```

FIG. 14

CONTROLLING THE RELEASE OF PRIVATE INFORMATION USING STATIC FLOW ANALYSIS

BACKGROUND

A user may supplement the functionality of his or her computing device by downloading a program from an online marketplace of programs. In many environments, an administrator of the marketplace may attempt to vet the programs that it offers to ensure that the programs do not pose an undue security risk to the end users. Nevertheless, some of the programs may still perform activities that may compromise the security of the users' private information. For example, a program that runs on a smartphone can access the location of a user, which is provided by a GPS mechanism of the smartphone. The program may then forward the private information to various entities, such as a social networking website.

To address these issues, the industry has proposed various safeguards. In one approach, a program developer or other agent may prepare a manifest that describes the resources that a program may access when it executes. A user may inspect such a manifest to determine whether it is appropriate to install and run the program. Alternatively, or in addition, a runtime environment can be configured to provide a dialogue which prompts the user whenever a program seeks access to private information, such as location information provided by a GPS mechanism.

However, these mechanisms do not provide a generally satisfactory solution to the above-described security risks. For example, these mechanisms may not provide enough reliable detail regarding a potential threat to enable the user to make an informed decision regarding whether to execute a program which accesses private information.

SUMMARY

A privacy control system is described herein for controlling the dissemination of private information by a program. In one implementation, the privacy control system includes a static analysis module and a consent solicitation module. The static analysis module performs static analysis on the program to identify at least one flow of private information from a source to a sink. The static analysis is particularly configured to identify at least one of two types of flow which are regarded as unsafe based on a policy: (a) a flow of untampered private information from the source to the sink, where the user is not given an opportunity (through a runtime dialogue) to confirm the safety of the flow; and (b) any flow of tampered private information from the source to the sink. Tampered private information corresponds to information that is modified, by the program, prior to being sent to the sink; untampered private information is information that has not been modified. The static analysis module then sends flow information to a user regarding the flow that has been detected.

The consent solicitation module displays a graphical user interface presentation that conveys the flow information provided by the static analysis module. Further, the consent solicitation module prompts the user to provide a privacy control decision regarding each identified flow. In one implementation, the privacy control decision governs whether actual data received from the source is provided to the sink, or anonymized (e.g., "fake") data is provided in place of the actual data. Alternatively, the privacy control decision governs whether the program is to be terminated. A runtime system then runs the program in accordance with whatever privacy control decision has been selected.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 14 shows source code of another program that can leak private information from a source to a sink.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative privacy control system that manages the dissemination of private information. Section B describes illustrative methods which explain the operation of the privacy control system of Section A. Section C describes illustrative computing functionality that can be used to implement any aspect of the features described in Sections A and B. And Section D provides additional information regarding one implementation of the static analysis performed by the privacy control system.

Figure 13:
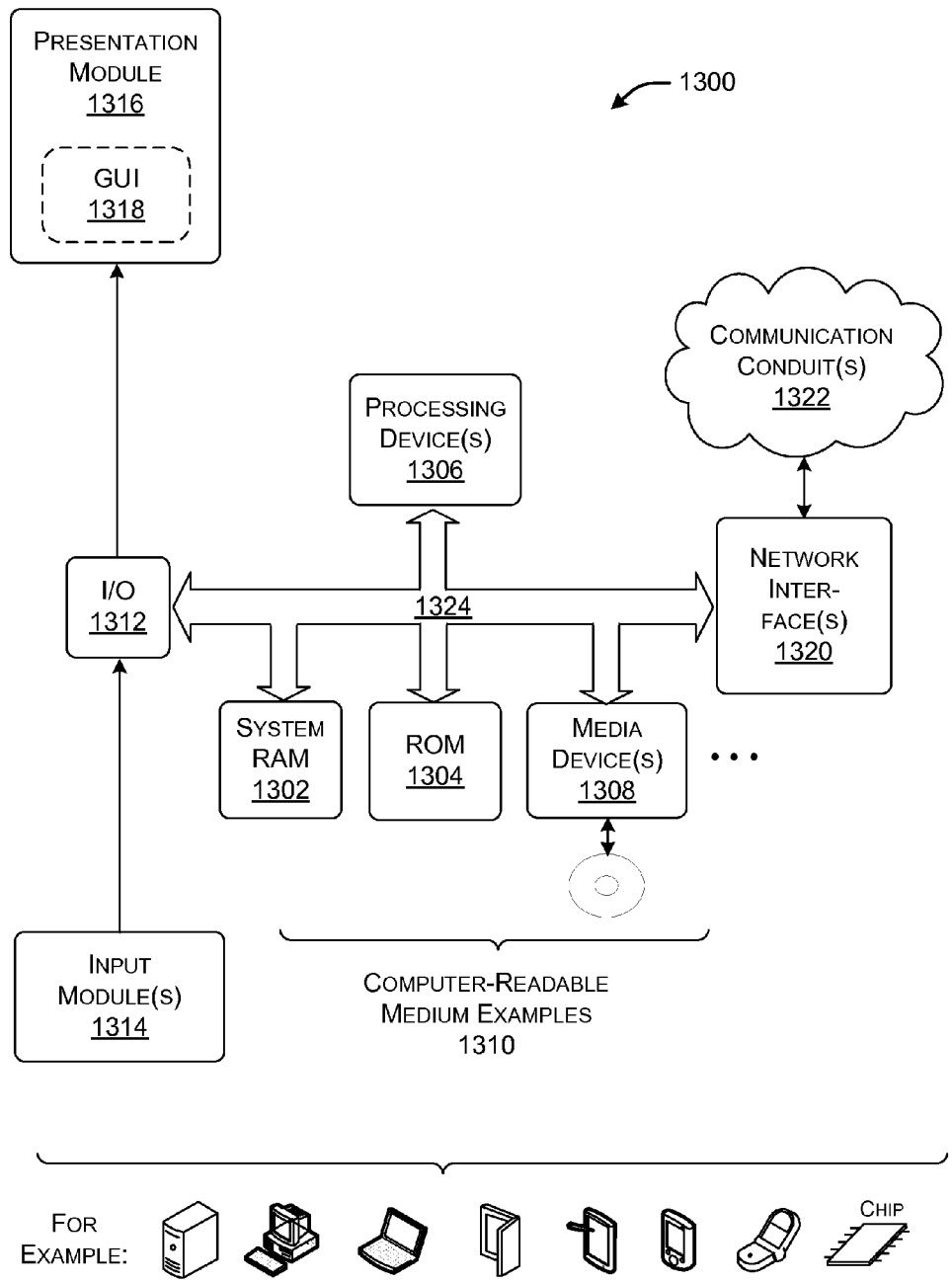
FIG. 13 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 13, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Mobile Device and its Environment of Use This section sets forth a privacy control system that manages the dissemination of private information by a program. Private information constitutes any information that a user considers sensitive for any environment-specific reason. In some cases, for instance, the private information may constitute information that pertains to the user, such as information that reveals the location of the user, information that identifies the contacts of the user, information associated with documents or files created by, maintained by, or otherwise associated with the user, and so forth.

Figures 1, 2:
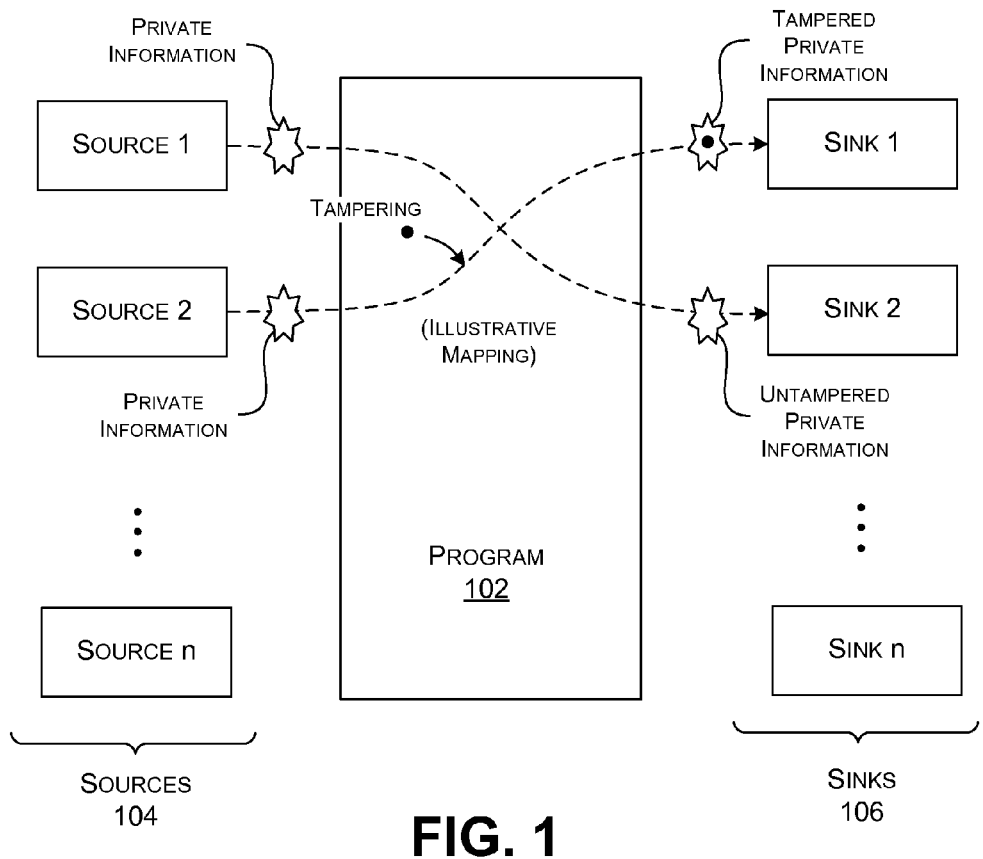
FIG. 1 shows a high-level graphical representation of one manner in which a program can leak private information from one or more sources to one or more sinks
FIG. 2 shows source code of an exemplary program that leaks private information to a sink.

Before advancing to a description of the privacy control system itself, first consider the behavior of an illustrative program which poses a risk of disseminating private information to entities. FIG. 1 shows a high-level representation of such a program 102. The program 102 can perform any type of function. For example, in some cases, the program 102 performs a high-level function, such as a social networking function. Alternatively, or in addition, the program 102 may perform a lower-level task, such as a file management function. In certain cases, the program can perform a standalone function. In other cases, the program can perform a function in conjunction with some programmatic framework. For example, the program may correspond to a browser add-on program which works in conjunction with a browser program.

The program 102 can be implemented in any manner, e.g., by using executable program statements expressed in any program language, script content, markup language content, etc. In one illustrative and non-limiting implementation, for example, the program 102 can be developed using the Touch-Develop framework, provided by Microsoft Corporation® of Redmond, Wash.

The program 102 can access private information from at least one source 104. Further, the program 102 can provide the private information to at least one sink 106. A source represents any component from which private information originates, while a sink represents any component which receives and consumes the private information. For example, assume that the program 102 is executed on a smartphone. The program 102 may access various sources provided by or otherwise associated with the smart phone, such as a camera, a location-determination device (such as a GPS mechanism), an accelerometer, a gryo device, a magnetometer, a microphone, a local repository of pictures, a local repository of audio files, a local contact store, and so on. The program 102 that runs on the smartphone can then send any received private information to any sink, such as any online service, a local or remote contact store, a local or remote media store, and so on.

In the particular case of FIG. 1, this figure shows that the program 102 retrieves private information from a first source (Source 1) and sends that information to a second sink (Sink 2). This path constitutes a first flow. The program also retrieves private information from a second source (Source 2) and sends that information to a first sink (Sink 1). This constitutes a second flow.

More specifically, the first flow sends the private information to the second sink in unmodified form. For example, if the private information corresponds to a picture, the first flow sends the picture to the second sink without changing the pixels in picture. By contrast, the second flow modifies the private information prior to sending it to the first sink. Again, consider the case in which the private information is a picture. The program 102 may embed additional private information into the digital data associated with the picture, such as the user's social security number, to produce a modified picture. The program 102 can then send that modified picture to the first sink. In some cases, the user may be unaware that the original private information has been altered, even though the user is presented with an opportunity to inspect the private information. For example, a user may be unable to detect that a picture has been modified, even if given an opportunity to study the picture.

More formally stated, the private information can be conceptualized in some cases as an object having at least two parts: an immutable part and a mutable part. For the case of the picture, the immutable part may correspond to metadata which describes the status of the picture, e.g., whether it exists or not. The mutable part may correspond to the pixel content of the picture itself. As will be set forth in greater detail (particularly in Section D), the program monitors the flow of private information in its original form, as well as private information in its modified form—referred to herein as tampered private information.

The security status of an object is referred to herein as the classification of that object. An object is classified when it contains private information. An object is unclassified when it does not contain private information.

FIG. 2 shows source code (developed using the TouchDevelop framework) of part of a program that leaks private information to a sink entity. More specifically, in line 2, the program defines a variable s, which, in its original state, does not pertain to private information. In other words, the variable s can be said to be "unclassified" at this point in execution of the program. In line 3, the program invokes a property "create picture( )" of the object "media," and assigns the result to the variable p. In other words, the program captures a picture from a camera and associates that picture with the variable p. In line 4, the program invokes a property "current location" of the object "senses," and assigns the result to the variable r. In other words, the program captures the location of the user from a location-determination device (such as a GPS mechanism), and assigns that location information to the variable r. In line 5, the program converts the location information associated with variable r to textual form and associates that result with the variable s. At this point, the variable s holds private information, and can therefore be said to be "classified."

Next, in line 6, the program adds the textual representation of the user's location to the picture data associated with variable p. In line 6, the program shares the picture that has been modified to a social network service (e.g., Facebook). Hence, this program manifests the type of concern outlined above. That is, the program adds sensitive data pertaining to the user to a picture, and then forwards that p picture to a social network service, where other users and entities can potentially extract the sensitive data. Even if the user inspects the picture, he or she may be unable to determine that personal data is being leaked to potentially untrusted sink entities.

Consider an alternative case (not shown) in which line 5 occurs after line 6. In this case, the variable s would not be considered problematical because the location is no longer embedded into the picture p, and thus no longer released to the social networking service.

The type of "tampering" described above is presented by way of illustration, not limitation. In another case (not shown), a program may capture a URL from any source. The program can then modify the URL by adding an additional text segment to it that reveals personal data pertaining to the user. As many URLs are long and complex, the user may not be able to readily detect the modification that has taken place, even if the modified URL is displayed to the user.

Figure 3:
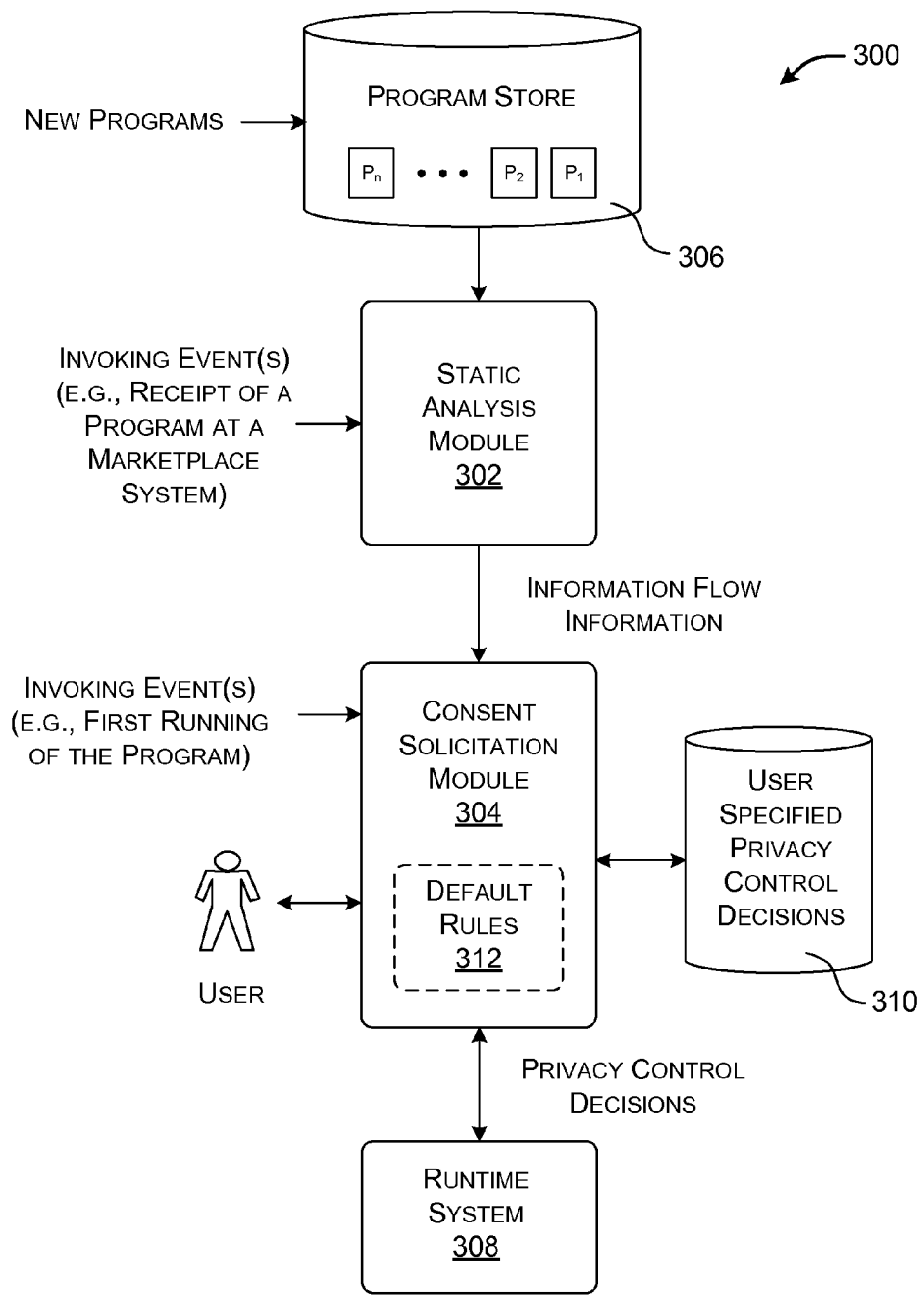
FIG. 3 shows an illustrative privacy control system that controls the dissemination of private information to sinks. The privacy control system includes a static analysis module and a consent solicitation module.

FIG. 3 shows an overview of a privacy control system 300 which alerts the user to flows of private information from sources to sinks. The privacy control system 300 can be conceptualized as including two principal components, a static analysis module 302 and a consent solicitation module 304.

The static analysis module 302 performs static analysis on one or more programs provided in a data store 306. By way of overview, the static analysis module 302 substitutes symbolic values for the variables in a program. The static analysis module 302 then simulates execution of the program in the symbolic domain, rather than literally executing the program in the runtime domain. In doing so, the static analysis module 302 recursively identifies all the possible paths by which information can flow through the program. As part of this exploration, the static analysis module 302 reveals the manner in which information extracted from one or more sources flows into one or more sinks FIG. 7 and the accompanying description provide additional information regarding the operation of the static analysis module 302. Section D provides yet further details regarding the static analysis module 302.

The consent solicitation module 304 presents flow information to a user regarding the flows that have been identified by the static analysis module 302. The consent solicitation module 304 can particularly alert the user to the existence of any flows deemed unsafe. Different environments can define what constitutes an "unsafe" flow in different respective ways. In one environment, the consent solicitation module 304 identifies at least one of two types of unsafe flows based on a policy. A first type of unsafe flow represents the flow of private information from at least one source to at least one sink, where: (a) the private information is not modified by the program prior to sending it to the sink; but (b) the user is not given an opportunity to verify the safety of the flow during execution of the program, e.g., through the use of a runtime consent dialog or the like. In the terminology used herein, the first type of flow is referred to as an untampered-unvetted flow. The flow is untampered because the private information is not modified; it is unvetted because the user is not given the opportunity to verify its safety. A second type of unsafe flow represents any flow of tampered private information from at least one source to at least one sink. This type of flow is considered unsafe regardless of whether the user is given the opportunity to vet the flow. It is appropriate to label a vetted tampered flow as unsafe for the reasons stated above; namely, the user may be unable to detect the presence of objectionable content even if he or she is given the opportunity to inspect the content. Other environments can apply policies that identify additional (and/or different) types of unsafe flows, compared to the two types of flows described above.

Figure 8:
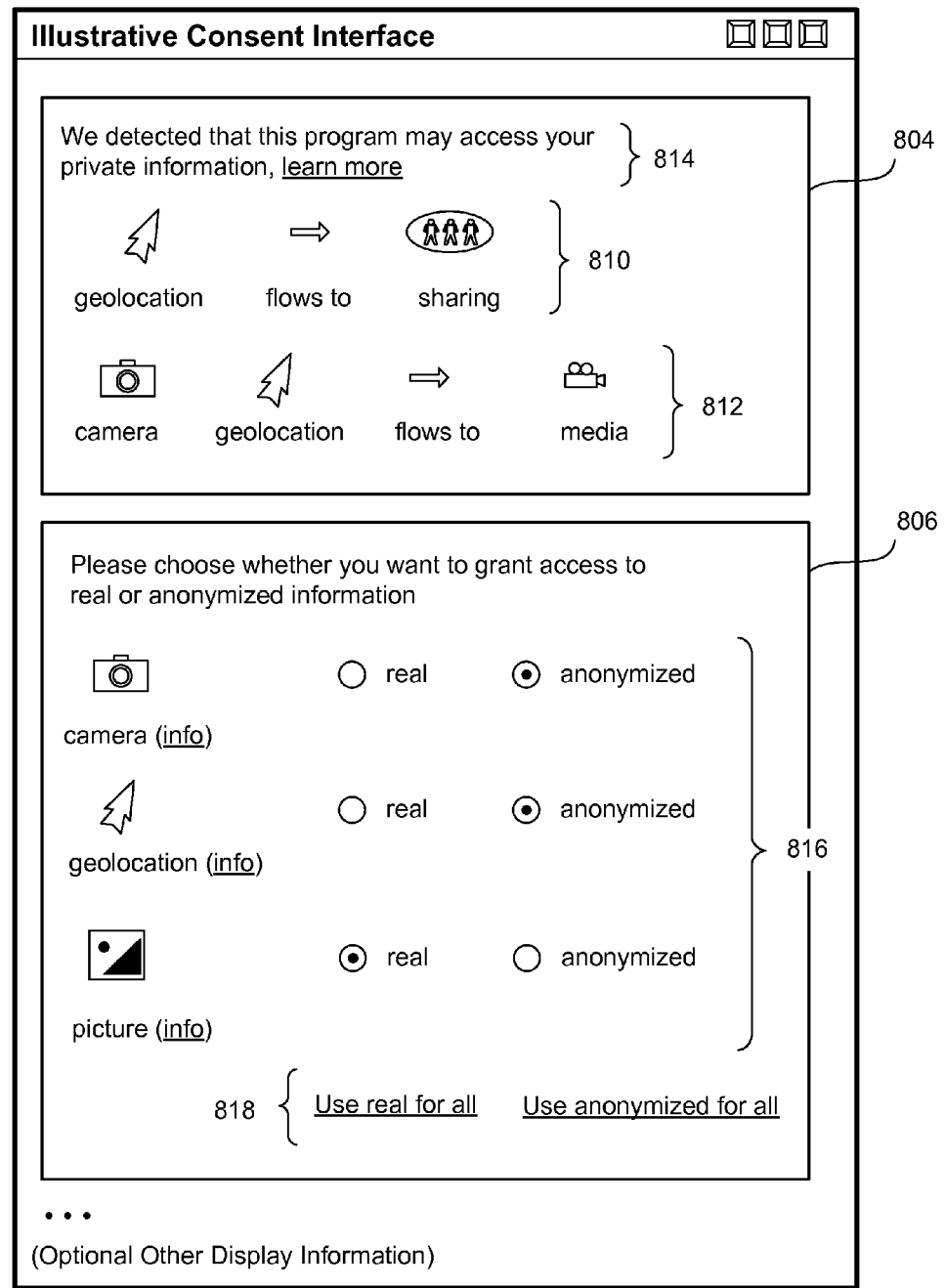
FIG. 8 shows an illustrative graphical user interface presentation provided by the consent solicitation module of FIG. 3.

In one implementation, the consent solicitation module 304 can present the above-described flow information via a graphical user interface presentation. In that presentation, the consent solicitation module 304 can use graphical symbols to represent different sources and sinks associated with each identified flow. FIG. 8 and the accompanying description provide additional information regarding one implementation of such a graphical user interface presentation.

In one implementation, the consent solicitation module 304 may omit information regarding flows that have been deemed safe. A safe flow includes any vetted-untampered flow, meaning any flow in which the private information has not been modified by the program, and in which the user has been given the opportunity to verify the safety of the flow. Another type of safe flow corresponds to any access to private information that does not subsequently "leak out" to any sink. However, in other implementations, the consent solicitation module 304 can also alert the user to the existence of these types of safe flows, or at least give the user the opportunity to inspect these types of flows.

As another principal task, the consent solicitation module 304 solicits a privacy control decision from the user with respect to each flow that has been identified by the consent solicitation module 304 as potentially unsafe (and, in some embodiments, each flow that has been identified as safe). Generally, a privacy control decision identifies the manner in which a runtime system 308 is to handle the flow of private information when running the program. In one case, the user may instruct the runtime system 308 to allow the flow to continue in a normal manner based on the actual data supplied by the source in question. For example, assume that the private information represents the location of the user. The user may instruct the runtime system 308 to forward the user's actual location (as sensed by a GPS mechanism) to the identified sink entity. In another case, the user may instruct the runtime system 308 to continue with the flow based on anonymized data instead of the actual data. The anonymized data represents "fake" or dummy information substituted in place of the actual data, such as a meaningless dummy location substituted in place of the actual location of the user. A user may opt to use anonymized information instead of actual data so utilize the functionality of the program without otherwise revealing sensitive information to any sink entity. In yet another case, the user may instruct the runtime system 308 to terminate the execution of the program. A data store 310 may store user's privacy control decisions with respect to each identified flow.

Alternatively, the user can provide privacy control decisions on a source-by-source basis, rather than a flow-by-flow basis. In this case, the user can instruct the runtime system 308 to use actual data from a source or anonymized data in place of the actual data, with respect to each flow that draws from the source. FIG. 8, to be described in turn, adopts this approach.

The consent solicitation module 304 can perform its operation based on one or more default rules 312. The default rules 312 can specify the criteria by which the consent solicitation module 304 discriminates between safe and unsafe flows. The default rules 312 can also define default privacy control decisions. The consent solicitation module 304 can apply the default privacy control decisions to different types of flows, such as by specifying, by default, that the runtime system 308 is to use actual data for all flows deemed safe and is to use anonymized data for all flows deemed potentially unsafe. The consent solicitation module 304 can then give the user the opportunity to selectively change any one or more of these default designations.

The runtime system 308 runs the program in accordance with the privacy control decisions that are persisted in the consent solicitation module 304. As noted above, the runtime system 308 can perform this task by executing the program using any combination of anonymized data and actual data for different respective flows. Alternatively, the runtime system 308 can abort the execution of the program in response to instructions from the consent solicitation module 304.

The static analysis module 302 can perform static analysis of a program in response to the receipt of an analysis-invoking event. For example, in one case, the static analysis module 302 may be implemented by a marketplace system (not shown). The marketplace system may maintain a repository of programs (e.g., in the data store 306). A user can access the marketplace system, review the programs that it offers, and download any program to his or her user computing device (such as a smartphone). In this environment, the analysis-invoking event may correspond to the receipt of a new program by the marketplace system 404. In other words, the marketplace system 404 may perform static analysis on each new program that it receives as part of its security-related vetting of the program, prior to making that program available for downloading by end users. Alternatively, or in addition, the analysis-invoking event may correspond to an instruction by an end user or other entity to perform static analysis on a program. For example, a user may download and install a program; then, at any later time, the user may request the static analysis module 302 to perform static analysis on the program.

Likewise, the consent solicitation module 304 can perform its operation in response to the receipt of a presentation-invoking event. In one case, the presentation-invoking event may correspond to an instruction by the user (or other entity) to install a particular program on the user's computing device. Alternatively, or in addition, the presentation-invoking event may correspond to an instruction by the user (or other entity) to run the program for the first time. The consent solicitation module 302 can persist any privacy control decisions made by the user in the data store 310 and apply these decisions to all later executions of the program. The user can also activate the consent solicitation module 304 at any later time to review and change any prior-specified privacy control decisions. For example, the user may initially make conservative policy control decisions, e.g., by requesting that the program apply anonymized data for a particular flow. After gaining confidence that the flow in question is unproblematic, the user may re-activate the consent solicitation module 304 to instruct the program to now apply actual data when performing the particular flow.

Figure 4:
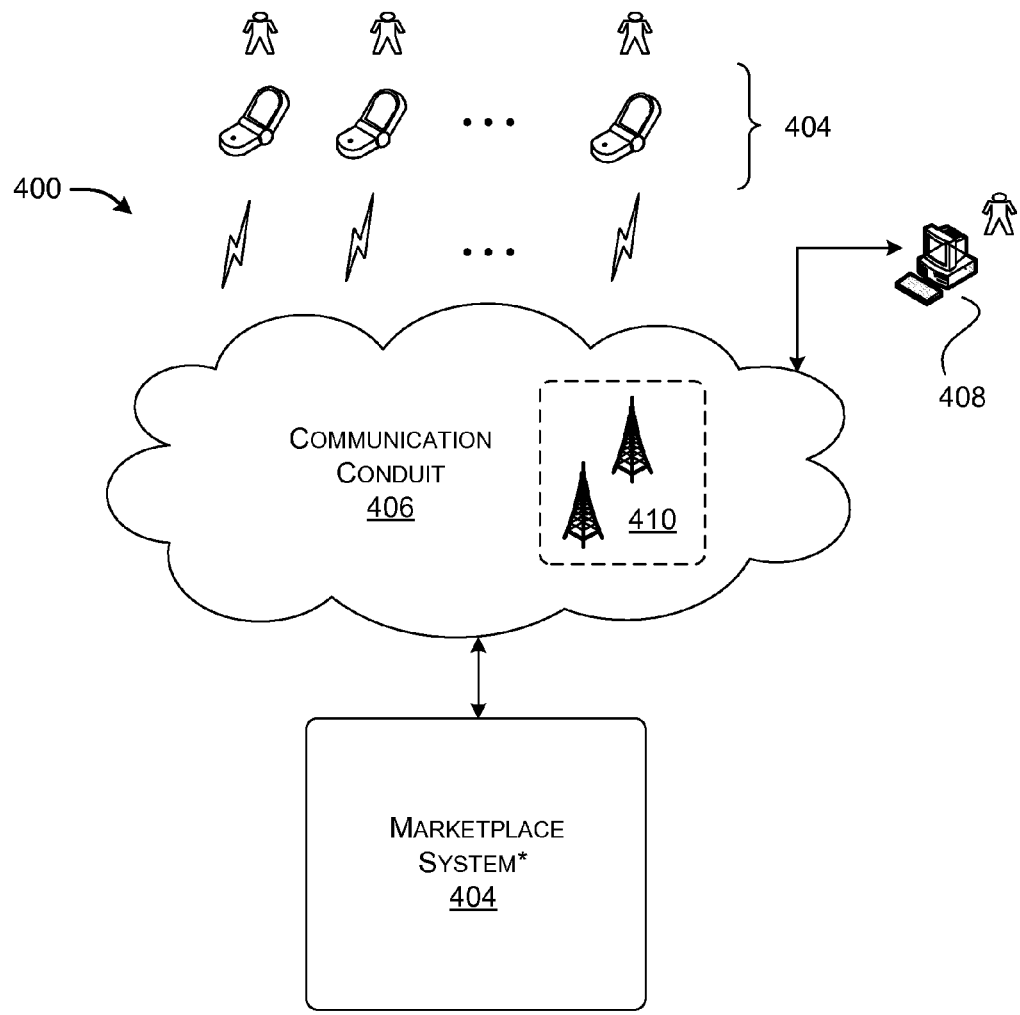
FIG. 4 shows an overview of an environment in which the privacy control system of FIG. 3 can be used.

FIG. 4 shows an illustrative environment 400 in which the privacy control system 300 (of FIG. 3) can be used. The environment 400 includes a collection of mobile devices 402 coupled to a marketplace system 404 (and/or other remote processing functionality) via a communication conduit 406. A mobile computing device may represent any type of computing functionality that has the capability of communicating with a remote entity via wireless communication. For example, any mobile computing device may represent a smartphone device, a laptop computing device, a tablet-type computing device, a personal digital assistant device, an electronic book reader device, a portable game device, and so on. Alternatively, or in addition, the user can access the marketplace system 404 using any type of traditionally stationary computing device having a wireless and/or wired communication interface, such as a personal computer, a game console device, a set-top box device, and so forth. FIG. 4 depicts one such illustrative user computing device 408.

The marketplace system 404 (and/or other remote processing functionality) can be implemented by one or more server computers, associated data stores, and/or other processing equipment. The functionality associated with the marketplace system 404 can be implemented at a single site or distributed over multiple sites. Further, the marketplace system 404 can be administered by a single entity or by multiple entities. A user can access the marketplace system 404 by specifying a network address (e.g., a URL) associated with the marketplace system 404.

The communication conduit 406 can represent any mechanism or combination of mechanisms that allows the user computing devices (402, 408) to communicate with remote entities (and to communicate with each other). Generally stated, the communication conduit 406 can represent any local area network, any wide area network (e.g., the Internet), or any combination thereof. The communication conduit 406 can be governed by any protocol or combination of protocols.

At least part of the communication conduit 406 can be implemented by wireless communication infrastructure 410. In one case, the wireless communication infrastructure 410 can represent a collection of cell towers, base stations, satellites, etc. The communication conduit 406 can also include wired network infrastructure.

The privacy control system 300 can be distributed among the components shown in FIG. 4 in any manner. For example, consider the two illustrative implementations shown in FIGS. 5 and 6, respectively.

Figure 5:
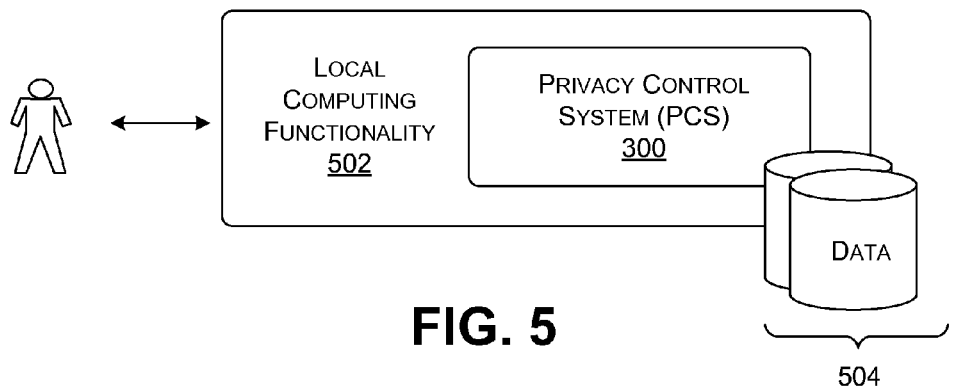
FIG. 5 shows an illustrative standalone implementation of the privacy control system of FIG. 3.

In the case of FIG. 5, local computing functionality 502 and its associated data stores 504 implement all aspects of the privacy control system 300. For example, the local computing functionality 502 may correspond to a mobile computing device shown in FIG. 4, such as a smartphone. That mobile computing device can include logic for implementing both the static analysis module 302 and the consent solicitation module 304.

Figure 6:
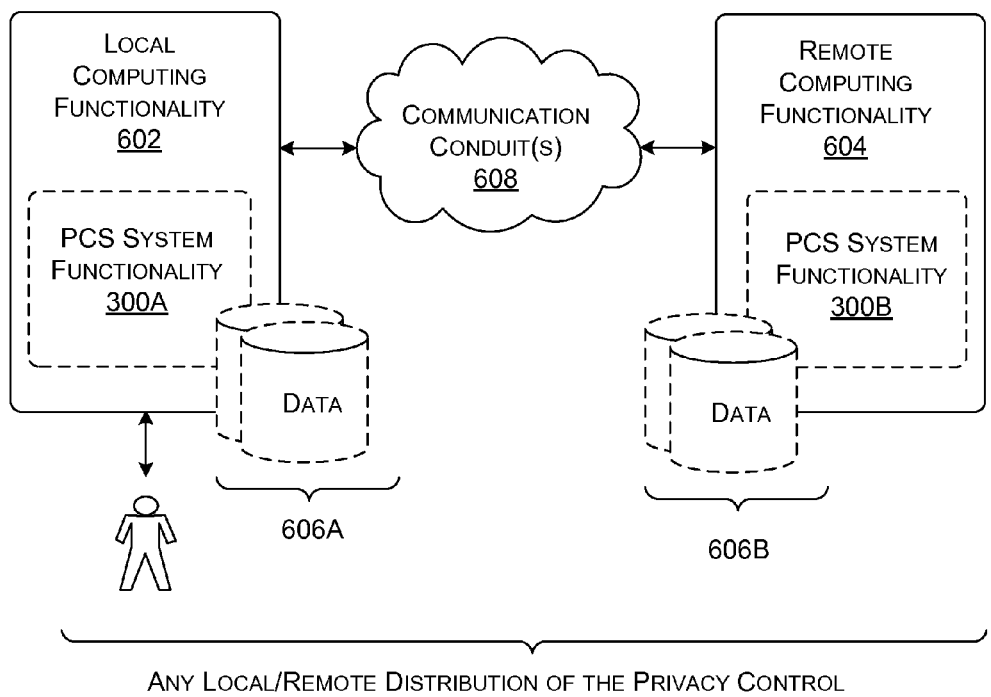
FIG. 6 shows an illustrative distributed implementation of the privacy control system of FIG. 3.

In the case of FIG. 6, local computing functionality 602 can implement at least some aspects of the privacy control system 300, and remote computing functionality 604 can implement other aspects of the privacy control system 300. FIG. 6 conveys this point by showing that the local computing functionality 602 includes privacy control system (PCS) functionality 300A and associated data stores 606A, while the remote computing functionality 604 includes PCS functionality 300B and associated data stores 606B. For example, the remote computing functionality 604 can correspond to the marketplace system 404 of FIG. 4, or some other remote processing functionality. The marketplace system 404 can implement the static analysis module 302 using cloud computing resources. The local computing functionality 602 may correspond to a mobile computing device shown in FIG. 4, such as a smartphone. The mobile computing device can implement the consent solicitation module 304. More specifically, the consent solicitation module 304 can receive flow information associated with a particular program when it downloads that program from the marketplace system 404. Alternatively, or in addition, a user may operate the mobile computing device to instruct the marketplace system 404 to perform static analysis with respect to any program at any given time after installation, and forward the results of its analysis to the mobile computing device. These allocations of functions to different processing components are cited by way of example, not limitation; still other implementation options are possible.

In still another implementation, the remote computing functionality 604 can implement all aspects of the privacy control system 300. For example, the remote computing functionality 604 can perform static analysis for a set of programs and then provide a network-accessible service that users can access to examine the flow information associated with any program. The network-accessible service can also provide an interface that allows individual users to make privacy controlled decisions. The privacy control decisions for each user, with respect to each program, can be stored locally or remotely, or some combination thereof.

Figure 7:
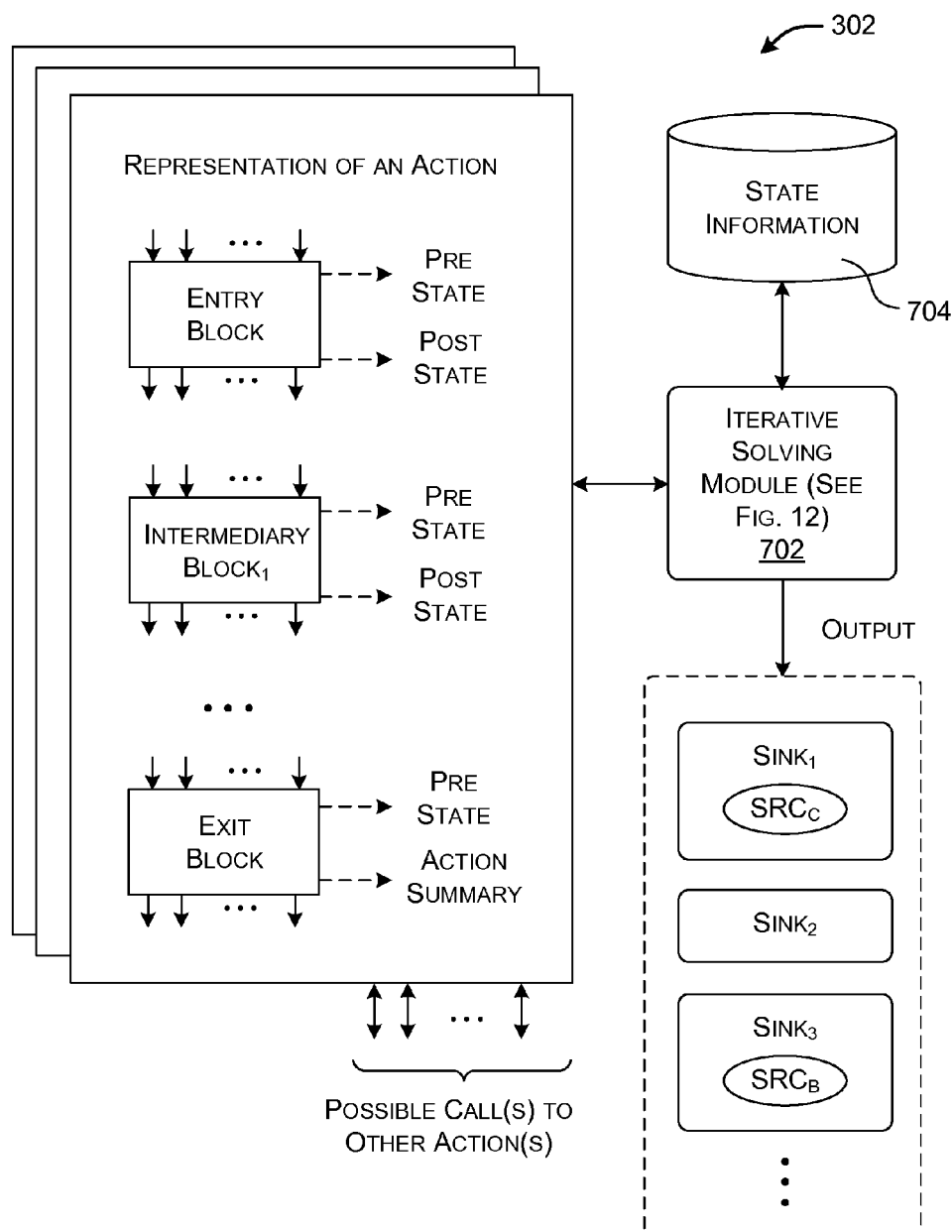
FIG. 7 shows one implementation of the static analysis module of FIG. 3.

Advancing now to FIG. 7, this figure shows an overview of the operation of the static analysis module 302. The Appendix of Section D provides more formally-expressed details regarding one manner of operation of this functionality.

In one approach, the static analysis module 302 can use an iterative solving module 702 to compute the flow information. The iterative solving module 702 performs this task by symbolically processing the program in parts. That is, iterative solving module 702 breaks the program into one or more actions. Each action performs a distinct task within the program, accepting any number of parameters and providing any number of results. Each action, in turn, forms a control flow graph composed of a plurality of basic blocks (simply "blocks" hereinafter). Each block performs a subtask within an action. More specifically, each action includes an entry block, an exit block, and one or more intermediary blocks. The entry block represents a starting operation of the action, the exit block represents a terminal operation of the action, and the intermediary blocks represent intervening operations performed by the action. Conditionals branching on condition c in an action are transformed into non-deterministic branches to appropriate then and else basic blocks, where the target bocks are augmented with a first instruction of the form "assume(c)" and "assume(not c)." Finally, each block contains one or more statements that can be executed in the symbolic domain.

The iterative solving module 702 simulates the actual running of a program by symbolically executing the statements in each block, using a fixed-point algorithm. The iterative solving module 702 then stores state information in a data store 704 which reflects the transformation of state that is produced by the symbolic execution of the statement. (As will be set forth in Section D, the state information may be composed of multiple state components, describing different respective aspects of the state at a particular point in the program.) Further, upon symbolically executing all of the statements in a block, the iterative solving module 702 stores block summary information. The block summary information reflects the transformation in state that has been produced by the block as a whole. Further still, upon symbolically executing all of the blocks in an action, the iterative solving module 702 stores action summary information. The action summary information corresponds to the state of the program at the termination of the action, which also corresponds to the output state of the exit block within that action. Further note that any block can call one or more other actions. Each action that is called can return one or more values which represent the results of its symbolic execution.

More specifically, the iterative solving module 702 starts by applying initial symbolic input assumptions to certain blocks. The iterative solving module 702 then computes block and action summaries based on these initial assumptions. The results of this symbolic execution may yield further information which modifies (e.g., augments) the initial assumptions applied to the blocks and actions. To address the new information, the iterative solving module 702 repeats its symbolic execution based on the new set of symbolic input assumptions, yielding updated block and action summaries. The iterative solving module 702 performs this iterative processing until the symbolic execution of the program yields no further changes in the block or action summaries. In other words, the iterative solving module 702 repeats its analysis until a fixed point is reached, at which time the static analysis has gleaned all possible insights regarding the operation of the program, without, in fact, actually running the program in the runtime domain.

Once the fixed point is reached, the state information provided in the data store 704 reveals all of the paths that may be taken in the program. Some of those paths may take private information from one or more sources and supply that it to one or more sinks. In the symbolic domain, a source contributes information to a sink if it can be determined that a symbolic trace of the sources ends up in the abstract state of the sink in question. For example, FIG. 7 indicates, in high level form, that a source C contributes to a first sink ($sink_1$), while a source B contributes to a third sink ($sink_3$) The state information can also reveal whether or not private information is modified by the program prior to being sent to a sink.

Advancing now to FIG. 8, this figure shows additional details regarding one manner of operation of the consent solicitation module 304. More specifically, without limitation, this figure shows one particular type of graphical user interface presentation 802 that may be displayed by the consent solicitation module 304 upon the occurrence of a presentation-invoking event (such as the execution of a program for the first time).

The graphical user interface presentation 802 can include two general sections. A first section 804 expresses the flow information that has been determined by the static analysis module 302. A second section 806 solicits privacy control decisions from the user. Other implementations can differ from this example in any way, such as by providing different information, different functionality, different arrangements of parts, different appearances of the parts, etc.

More specifically, in one implementation, the first section 804 can provide graphical information that represents each flow that has been identified as unsafe by the static analysis module. In one approach, for instance, the first section 804 can assign graphical symbols to each source involved in a flow, as well as each sink. For example, a first flow 810 conveys that private information is pulled from a geolocation source (e.g., a GPS mechanism) and sent to a social networking web site. For example, this flow may correspond to a program which accesses the user's location and sends it as a text message to the social networking site. A second flow 812 conveys that private information is pulled from both a camera device and a geolocation source and sent to a local or remote media repository. For example, this flow may correspond to a program which embeds the user's location into a picture taken by the camera, and then stores the picture in some local or remote media repository. A user may activate a prompt 814 to obtain additional information regarding any particular flow. For example, the user can activate this prompt 814 to determine whether a particular flow tampers with the private information; this will enable the user to make a more informed decision as to whether to permit the flow to proceed.

The second section 806 identifies all the sources implicated in the first section. The second section 806 also includes an input mechanism 816 which invites the user to specify whether actual (i.e., "real") or anonymized data is to be used for each respective source. In this example, the input mechanism 816 corresponds to a pair of radio buttons for each source for choosing between actual and anonymized data for that source. Although not shown, the second section 806 can invite the user to make consent decisions with respect to individual flows, rather than individual sources. In that alternative approach, a user can instruct the consent solicitation module 304 to use anonymized data for a source in one particular flow, but actual data for the same source in another flow.

In one implementation, the consent solicitation module 304 can initially apply default privacy control decisions with respect to each identified source (or for each individual flow). For example, assume that all of the flows shown in the first section 804 represent unsafe flows. In that case, the consent solicitation module 304 can initialize the second section 806 such that all of the anonymized radio buttons are selected and none of the actual radio buttons are selected. The user can then selectively modify any of these default decisions, such as by selecting the use of actual data for the picture-related source. In addition, a user may activate one of the prompts 818 to instruct the consent solicitation module 304 to use actual data for all sources (or flows), or to use anonymized data for all sources (or flows).

Although not shown, the graphical user interface presentation 802 can also include control prompts which allow a user to terminate at least part of a program, to thereby prevent that program from accessing private information. For instance, such a control prompt may read, "abort program now," or "abort action now," etc. If a program is aborted, the consent solicitation module 304 can store a stack trace indicating the series of statements that have been executed, up to the point of termination. A user with programming skills may later inspect that trace, in conjunction with the source code of the program, to gain further insights regarding the propriety of the information flow in question.

B. Illustrative Processes

FIGS. 9-12 show procedures that explain one manner of operation of the privacy control system 300 of FIG. 3. Since the principles underlying the operation of the privacy control system 300 have already been described in Section A, certain operations will be addressed in summary fashion in this section.

Figure 9:
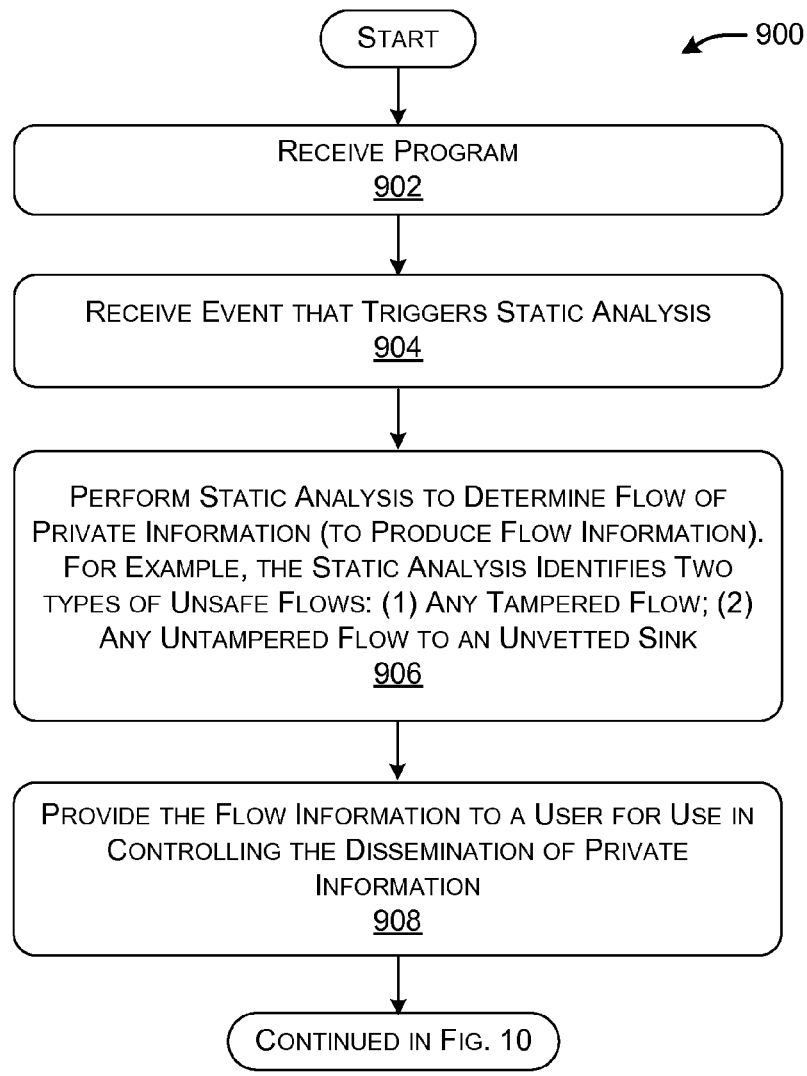
FIG. 9 is a flowchart that shows one illustrative manner of operation of the static analysis module of FIG. 3.

Starting with FIG. 9, this figure shows a procedure 900 that explains one manner of operation of the static analysis module 302. In operation 902, the static analysis module 302 receives a new program for analysis. For example, the static analysis module 302 may receive the new program when it is submitted to the marketplace system 404 from some program source (e.g., a developer or end user). In operation 904, the static analysis module 904 receives an analysis-invoking event which triggers it to perform static analysis. For example, the analysis-invoking event can correspond to the receipt of the program at the marketplace system 404 or an instruction by an end user or other entity, etc.

In operation 906, the static analysis module 302 performs static analysis to identify any flows of private information in the program from respective sources to sinks. The static analysis module 302 can specifically identify at least two types of unsafe flows described in Section A: a) unvetted-untampered flows; and b) tampered flows, regardless of whether the flows are vetted or not. In operation 908, the static analysis module 302 expresses its conclusions as flow information and sends that flow information to a user for inspection.

Figure 10:
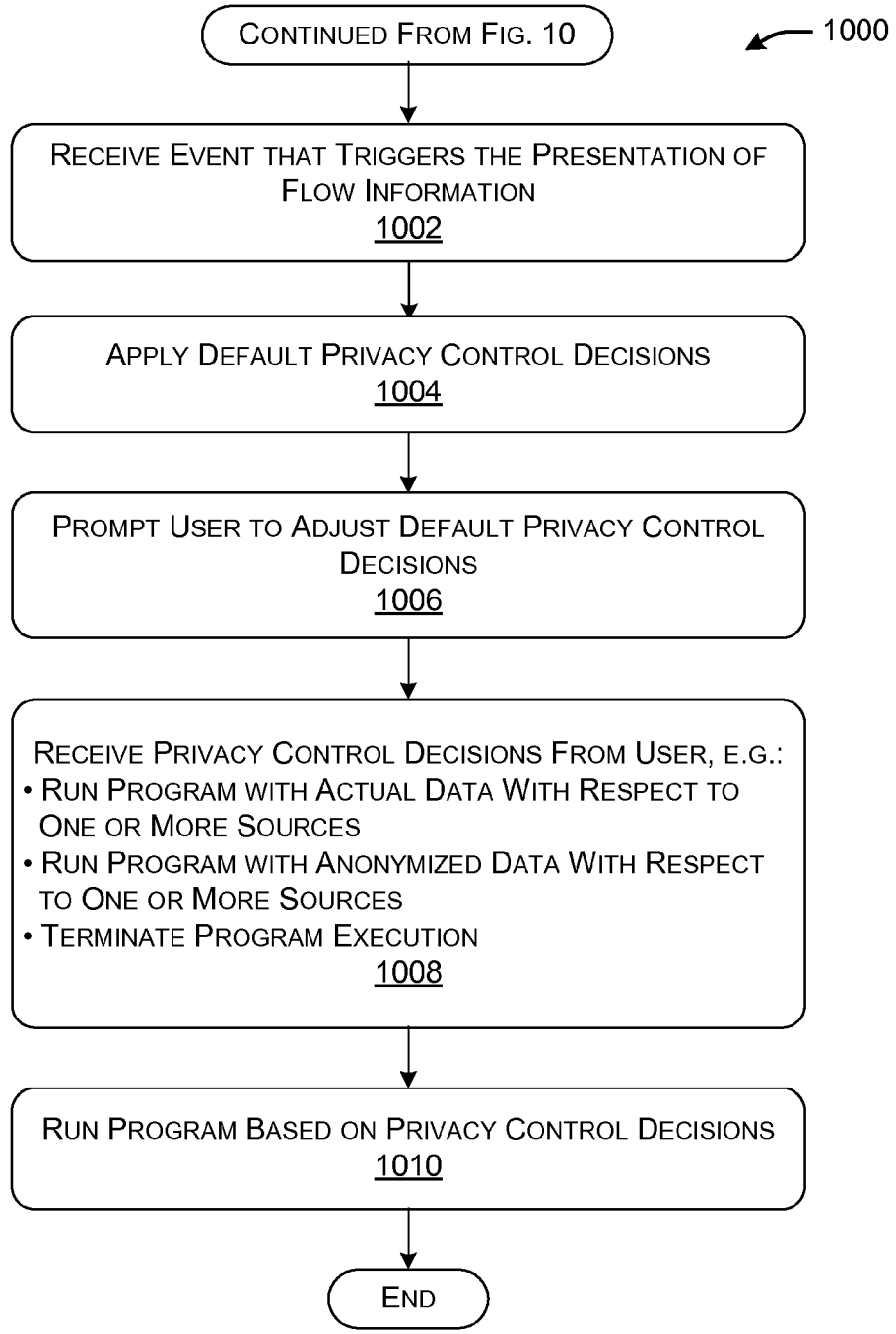
FIG. 10 is a flowchart that shows one illustrative manner of operation of the consent solicitation module of FIG. 3.

FIG. 10 shows a procedure 1000 that represents one illustrative manner of operation of the consent solicitation module 304 of FIG. 3. In operation 1002, the consent solicitation module 304 receives a presentation-invoking event that triggers the presentation of flow information to the user. For example, this event may correspond to one or more of: a) the installation of a program; b) the first execution of the program; or c) the express instruction of a user at any time after installing and running the program.

In block 1004, the consent solicitation module 304 may apply one or more default policy control decisions to one or more sources, or to one or more individual flows. For example, the consent solicitation module 304 can indicate that all unsafe flows (as defined above) will use anonymized data instead of actual data, and all safe flows will use actual data. In operation 1006, the consent solicitation module 304 invites the user to modify any one of the default policy control decisions, e.g., by selecting the appropriate radio button in the input mechanism 816 of FIG. 8. In operation 1008, the consent solicitation module 304 receives and stores the privacy control decisions of the user (e.g., whether to use actual or anonymized data for each source or each flow, or whether to abort the program). In operation 1010, the runtime system 308 executes the program in accordance with the privacy control decisions defined in operation 1008.

Figure 11:
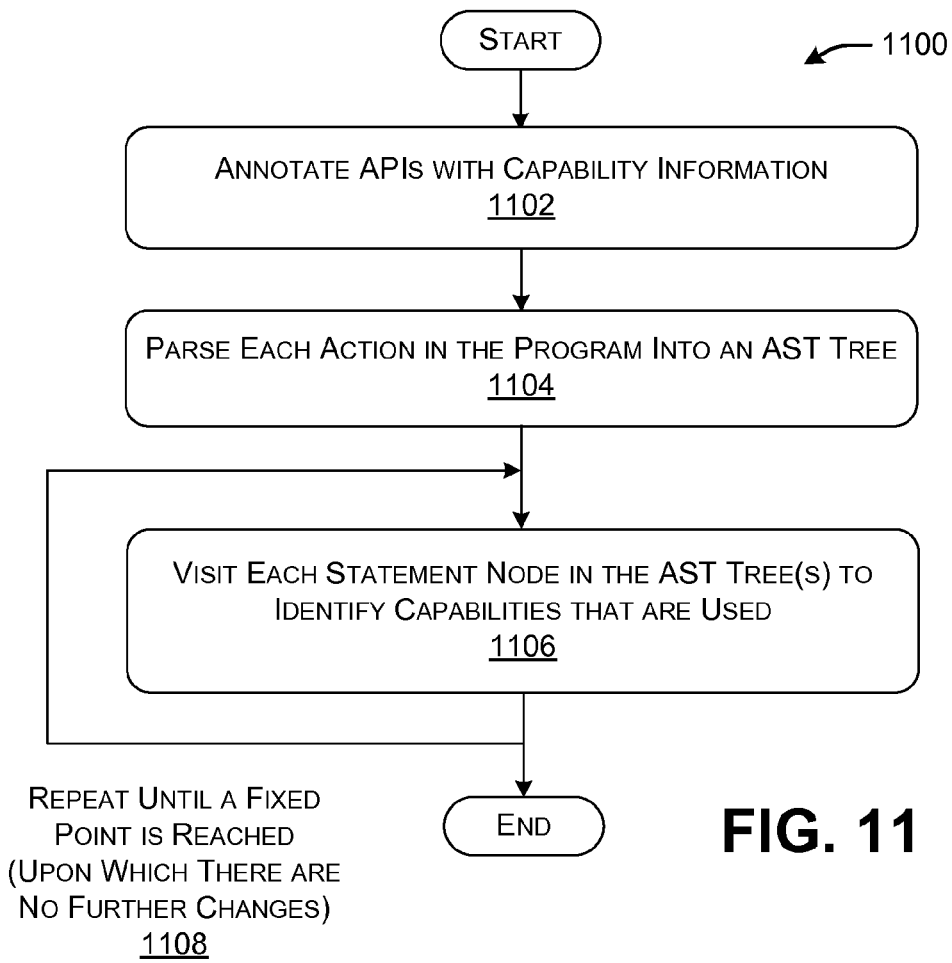
FIGS. 11 and 12 are flowcharts that provide additional details regarding one manner of operation of the static analysis module of FIG. 3.

FIG. 11 shows a procedure 1100 that explains one way in which the static analysis module 302 can determine what sources and sinks are associated with a particular program. In the preliminary operation 1102, each interface (e.g., each API) associated with each sink and source is annotated with capability information. That capability information identifies the types of sources and sinks with which each interface interacts. In operation 1104, the static analysis module 302 parses each action into an abstract syntax tree (AST). In operation 1106, the static analysis module 302 visits each statement node in the ASTs to identify the source and sink capabilities associated with the statement node. If a statement in an action $a_1$ is an action call to another action $a_2$, operation 1106 entails adding the sources and sinks of $a_2$ to $a_1$. The static analysis module 302 repeats the above-described process (of identifying source and sink capabilities) until a fixed point is reached, meaning that further investigation does not yield a change in the identified sources and sinks.

Figure 12:
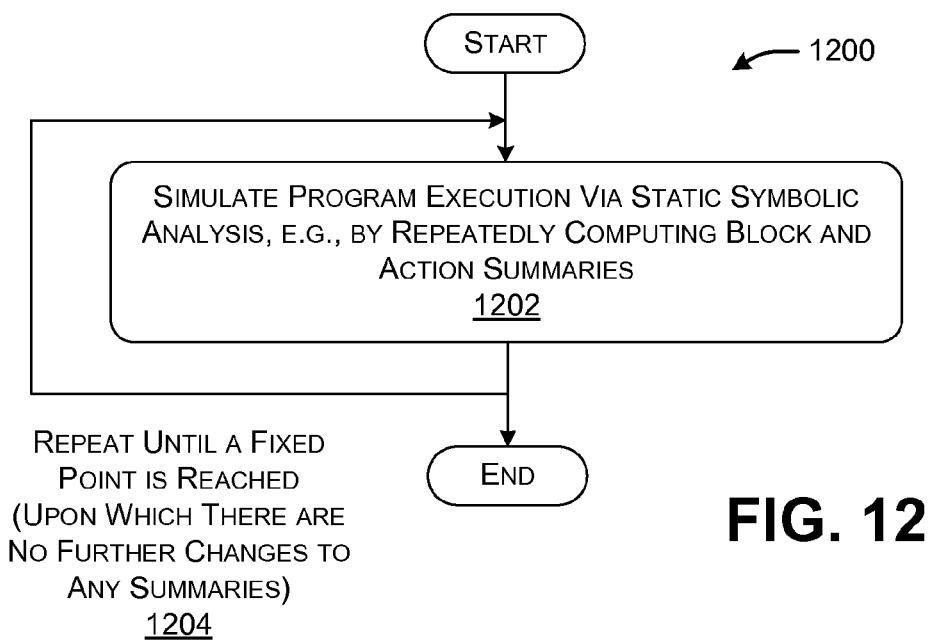

FIG. 12 shows a procedure 1200 that explains one way in which the static analysis module 302 can determine the particular flows in the program from sources to sinks (whereas the procedure 1100 of FIG. 11 involved just enumerating capabilities of the program). In the sole operation 1202, the static analysis module 302 symbolically executes the program, e.g., by repeatedly computing block and action summaries. As per operation 1204, the static analysis module 302 repeats this process until there is no further change in the block and action summaries.

C. Representative Computing Functionality

FIG. 13 sets forth illustrative computing functionality 1300 that can be used to implement any aspect of the functions described above. For example, the computing functionality 1300 can be used to implement any aspect of privacy control system 300, e.g., as implemented by the functionality of FIG. 5 or 6, etc. For instance, the computing functionality 1300 can be used to implement a mobile computing device, a server computing device, etc. In all cases, the computing functionality 1300 represents one or more physical and tangible processing mechanisms.

The computing functionality 1300 can include volatile and non-volatile memory, such as RAM 1302 and ROM 1304, as well as one or more processing devices 1306 (e.g., one or more CPUs, and/or one or more GPUs, etc.). The computing functionality 1300 also optionally includes various media devices 1308, such as a hard disk module, an optical disk module, and so forth. The computing functionality 1300 can perform various operations identified above when the processing device(s) 1306 executes instructions that are maintained by memory (e.g., RAM 1302, ROM 1304, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In all cases, the computer readable medium 1310 represents some form of physical and tangible entity.

The computing functionality 1300 also includes an input/output module 1312 for receiving various inputs (via input modules 1314), and for providing various outputs (via output modules). One particular output mechanism may include a presentation module 1316 and an associated graphical user interface (GUI) 1318. The computing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

D. Appendix: Formal Description of the Static Analysis Module Operation

This section provides additional details regarding the operation of the static analysis module 302 according to one illustrative and non-limiting implementation. As mentioned in Section A, the static analysis module 302 recursively calculates block and action summaries by symbolically executing statements in a program. The static analysis module 302 repeats this process until a fixed point is reached (upon which there is no further changes in the block or action summaries).

The state information at a particular point in the execution of a program can be conceptualized as having multiple components. A local variable (L) component maps local variables to sets of sources. A sink (S) component maps sinks to sources flowing to those sinks An M component and an R component capture mutable state information. More specifically, as indicated in Section A, a mutable value refers to a part of an object that is modifiable by a program, as opposed to an immutable part of the object (which is not modifiable). The state keeps track the mutable part of a value using an abstraction in which there is a single mutable location per type. In this context, the M component maps a single mutable location for each type to sources. The R component expresses pointers from one mutable location to another. That is, the R component helps keep track of values that have embedded pointers to other values that could be mutable (as described in the example below).

Finally, a PC component captures implicit flow information, associated with an added local variable named pc. More specifically, the static analysis module 302 assigns source information to the pc variable at conditionals in the program, e.g., at the entry of the branches associated with the conditionals. From a high level standpoint, the PC component helps capture the role that conditional statements in a program may have in propagating private information to sinks (as described in the example below).

The L, S, and PC components are program point specific, meaning that they vary for different points in the program. The M and R components are not program point specific.

To clarify the meaning of the above-described components, consider the illustrative program shown in FIG. 14. At line 5, the program adds the message "msg" to the message collection "msgs." The message collection "msg" maintains references to the messages that it stores. This means that the program can access the individual message "msg" from the message collection "msgs" at a later time. At line 6, the program associates location data with the message "msg," making this message classified information. This operation, in turn, indirectly renders the entire message collection "msgs" classified. At line 7, the program defines a message "msg2," corresponding to the i-th message in the collection "msgs." The message "msg2" may contain the data of "msg" or it may contain the data of other messages. In response to the former possibility (that "msg2" contains the data of "msg"), the message "msg2" is also considered classified information.

Advancing further into the source code, line 10 indicates that, if the variable s corresponds to the string "Seattle," then the variable y is set to "true." The variable s, in turn, ultimately reflects the output of a location-determination mechanism. Hence, by observing the output of this if-then-else block, an observer can indirectly glean information regarding the location of the user. Namely, by observing whether y is true or not, an observer can determine whether the user's location is Seattle. Hence, the variable y is considered classified information.

The symbolic execution of this action yields action summary information, which reflects the state of the action at the termination of the action. The local variable (L) component of the state information indicates that: (a) the local variable s contains geolocation data; (b) "pic" contains the camera data, and (c) the variable y contains geolocation data due to the implicit flow from s to y. The sink (S) component indicates that a site associated with the sharing sink contains camera data, which originates from the local "pic." The state of the M component indicates that the mutable state of "Picture" contains the camera data and the mutable state of "Message" contains the geolocation data. The R component of the state information contains a pair showing that "MessageCollection" is linked to "Message." Due to this link, "msg2" reads the mutable data of "msgs" and is considered to contain the geolocation data. Finally, the PC component is empty, since the pc variable does not carry the camera data after the if-then-else block.

The manner of operation of the static analysis module 302 can now be described in greater detail in the context of the above-described state components. The static analysis module 302 can compute a block summary for a particular block by mapping the change in state produced by the block. That is, the static analysis module 302 can determine the pre-state at the beginning of the block with respect to each of the state components described above. The static analysis module 302 can then compute the post-state at the end of each block, for each of the state components. The block summary information describes the transition that has occurred between the pre-state of the block and the post-state of the block. To compute the initial state of a block, in turn, the static analysis module 302 can form the union of the post-states of each of the predecessor blocks on which the particular block in question depends, with respect to each component. To repeat, the action summary information reflects the output state of the exit block of the action in question.

More formally stated, a block summary can be expressed using the following information:

Atom::=Source($i$)|Parameter($i$)|$PC_{in}$

Classification::=Set of Atom

LocalMap::=Block→Local→Classification

SinkMap::=Block→Sink($i$)→Classification

PCMap::=Block→Classification

MutableState::=Kinds($i$)→Classification

References::=Set of (Kinds($i$)×Kinds($i$)).

The LocalMap, SinkMap, PCMap, MutableState, and References can be used to express the transformation between the pre-state of a block and the post-state of a block, for each of the L, S, PC, M, and R components, respectively. $PC_{in}$ refers to the PC information that is "input" to the block.

To compute the post-state of any block, the static analysis module 302 considers the change in state produced by the symbolic execution of each statement in the block, with respect to each component of the state information. Different statements produce different types of transformations. For example, consider a program which contains the following types of statements. A first type of program statement is a simple assignment from one local variable to another. A second type of program statement corresponds to a primitive property invocation of parameters $x_1, \ldots, x_2$, binding the results to a variable r. A third type of program statement corresponds to an action invocation with parameters $x_1, \ldots, x_m$, binding the result of the action to $r_1, \ldots, r_n$. A fourth type of program corresponds to an assume statement arising from conditional branches.

As a preliminary step, the static analysis module 302 can annotate all primitive properties with a set ReadsMutable that includes the indices of parameters whose mutable state is read by the property. The static analysis module 302 further provides a set WritesMutable that includes the parameter indices of parameters whose mutable state is written by the property. An index 0 in the WritesMutable set indicates whether the mutable state of the result depends on the classification of all the inputs to the property. Additionally, the static analysis module 302 provides a set EmbedsLinks that contains the set of edges between kinds that are potentially established by the property as references from the mutable state of one value to another.

The following description sets forth the statement transformations produced by the different statements identified above. In the following, the symbols L, PC, M, and R refer to the states of the components prior to the symbolic execution of the statement in question. The symbols L', PC', M', and R' refer to the states of the components after the execution of the statement.

(1) First type of statement: x:=y.

The transformations produced by the first type of statement is given by:

$L'=L[x \mapsto L(y) \cup PC]$ $PC'=PC$ $M'=M$ $R'=R$ $S'=S.$

These equations indicate that the post-state has the same PC, M, R, and S components as the initiate pre-state. For the L component, the static analysis module 302 defines the post-state L' to correspond to the local variable information for the variable y, subject to the implicit flow tracked by the PC information.

(2) Second type of statement: $r:=p(x_1, \ldots, x_n)$.

To compute the transformation for this statement, the static analysis module 302 first computes the input classification, which consists of the classification of all input parameters and the classification of all kinds for which there is a parameter annotated with ReadsMutable, that is:

$$\text{Common} = PC \cup \text{Sources}_p \cup \bigcup_i L(x_i) \cup \bigcup_{j \in \text{ReadsMutable}_p} Cl(M, R, \text{kind}(x_j)).$$

The helper function Cl(M,R,kind(x)) computes the union of the classification of all kinds j reachable from i via edges in R. Note that Reach(R,i,i) is true for all R. The helper function can be expressed as:

$$Cl(M,R,i) = \{M(j) | Reach(R,i,j)\}.$$

With this information, the static analysis module 302 can now update the state information as follows:

$$L' = L[r \mapsto Common]$$

$$PC' = PC$$

$$M'(i) = \begin{cases} M(i) \cup Common & \text{if } \exists\, j \in WritesMutable_p \text{ and } Reach(R, kind(x_j), i) \\ M(i) & \text{otherwise} \end{cases}$$

$$R' = R \cup EmbedsLinks_p$$

$$S'(i) = \begin{cases} S(i) \cup Common & \text{if } i \in Sinks_p \\ S(i) & \text{otherwise}. \end{cases}$$

(3) The third type of statement: $r_1, \ldots, r_n = a(x_1, \ldots, x_m)$.

The static analysis module 302 first updates $M_{pre}(entry_a)$ to $M \sqcup M_{pre}(entry_a)$ and $R_{pre}(entry_a)$ to $R \sqcup R_{pre}(entry_a)$. If necessary, the static analysis module 302 updates changes through blocks of a. The static analysis module 302 uses the state at the exit block of a as the summary of a to be applied at the current invocation. Since the summary contains some symbolic information for parameter classification and pc classification, the static analysis module 302 first instantiates the exit block information with the invocation site information. Let σ represent the substitution:

$$\sigma = [PC_{in} \mapsto PC, Parameter(i) \mapsto L(x_i)].$$

The static analysis module 302 then computes the instantiated versions of the exit block summary information as follows:

$$L_s = \sigma(L_{post}(exit_a))$$

$$M_s = \sigma(M_{post}(exit_a))$$

$$R_s = \sigma(R_{post}(exit_a))$$

$$S_s = \sigma(S_{post}(exit_a)).$$

Note that no PC information flows out of the action. Let $r'_1, \ldots, r'_n$ represent the result local variables in action a. The final states after the invocation of the action a are then:

$$L' = L[r_i \mapsto L_s(r'_i)]$$

$$PC' = PC$$

$$M' = M \sqcup M_s$$

$$R' = R \cup R_s$$

$$S' = S \sqcup S_s.$$

(4) Fourth type of statement: assume(x) or assume (not x).

The output state after the execution of this type of statement correspond to:

$$L' = L$$

$$PC' = PC \cup L(x)$$

$$M' = M$$

$$R' = R$$

$$S' = S.$$

Note that assume statements causes the PC classification to be augmented with the classification of the condition.

The above-described transformations do not take into account the possibility that a program may modify original private information to yield tampered private information. To address this case, the static analysis module 302 can introduce an operator Tamper that can be applied to existing sources. Additionally, the static analysis module 302 annotates all properties p with a single bit $Tampers_p$, indicating whether any input classifications are transformed into tampered output classifications for the result and writes to the mutable store. With the introduction of this operator, the rule for handling the flow at property invocations can be modified to compute a new Common, as follows:

$$InFlow = PC \cup \bigcup_i L(x_i) \cup \bigcup_{j \in ReadsMutable_p} Cl(M, R, kind(x_j))$$

$$Common = Sources_p \cup \begin{cases} InFlow & \text{if } \neg\, Tampers_p \\ Tamper(InFlow) & \text{if } Tampers_p. \end{cases}$$

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by computing functionality, for controlling dissemination of private information by a program, comprising the following steps as executed on a computing device comprising at least a processing device executing instructions maintained by a memory:
    receiving an analysis-invoking event;
    in response to the analysis-invoking event, performing static analysis to determine at least one flow within the program of private information from a source to a sink, the flow being determined to be unsafe based on a policy, wherein the flow determined to be unsafe comprises at least one of a flow of tampered private information from the source to the sink, the tampered private information corresponding to private information that is tampered with within the program prior to being sent to the sink, and a flow of untampered private information from the source to the sink, where a user is not given an opportunity to confirm the flow of the untampered private information; and
    providing flow information to the user regarding the flow that has been determined by the static analysis, for use by the user in controlling the dissemination of the private information to the sink.

2. The method of claim 1, wherein the static analysis comprises using a fixed-point algorithm to iteratively determine all flows of private information from a set of possible sources to a set of possible sinks.

3. The method of claim 1, further comprising:
receiving a presentation-invoking event;
in response to the presentation-invoking event, presenting the flow information regarding the flow that has been determined to be unsafe by the static analysis;
prompting the user to provide a privacy control decision regarding the flow; and
running the program in accordance with the privacy control decision.

4. The method of claim 3, wherein said presenting comprises displaying a graphical user interface presentation that depicts the flow information, where, in that graphical user interface presentation, the sink and source are assigned respective graphical symbols.

5. The method of claim 3, wherein the privacy control decision governs whether actual data or anonymized data is provided to the sink.

6. The method of claim 3, wherein the privacy control decision governs whether the program is terminated.

7. The method of claim 3, further comprising applying a default privacy control decision to the flow, and wherein said prompting asks the user to maintain or modify the default privacy control decision.

8. A computer readable storage device for storing computer readable instructions, the computer readable instructions providing a privacy control system when executed by one or more processing devices, the computer readable instructions comprising:
logic configured to receive an analysis-invoking event; and
logic configured to perform static analysis, in response to the analysis-invoking event, to determine at least one tampered flow of private information within a program from a source to a sink, or untampered-unvetted flow,
the tampered flow corresponding to a flow in which private information is received from the source, tampered by the program, and sent to the sink in tampered form; and
the untampered-unvetted flow corresponding to a flow in which the private information is not tampered, but in which the user is not given an opportunity to confirm the flow of the private information.

9. The computer readable storage medium of claim 8, wherein the private information is tampered in a manner that is not readily detectable by a user.

10. The computer readable storage medium of claim 8, further comprising:
logic configured to receive a presentation-invoking event; and
logic configured to present flow information regarding the tampered flow and the untampered-unvetted flow that have been determined by the static analysis.

11. The computer readable storage medium of claim 10, further comprising:
logic configured to prompt the user to provide a privacy control decision regarding each flow of private information; and
logic configured to receive each privacy control decision from the user,
wherein each privacy control decision governs a manner of running the program with respect to each flow of private information.

12. The computer readable storage medium of claim 11, wherein each privacy control decision governs whether actual data or anonymized data is provided to a sink associated with a flow.

13. The computer readable storage medium of claim 11, wherein each privacy control decision governs whether the program is terminated.

14. A computer system comprising one or more processing devices that execute instructions stored in a memory, for controlling dissemination of private information by a program, and further comprising an executable consent solicitation module, the consent solicitation module comprising:
logic configured to display a graphical user interface presentation to a user, the graphical user interface presentation conveying flow information regarding a flow of private information within a program that has been determined by static analysis,
the graphical user interface presentation presenting at least one of two types of flow, the two types including:
a flow of untampered private information from a source to a sink, where the user is not given an opportunity to confirm the flow of the untampered private information; and
a flow of tampered private information from the source to the sink, the tampered private information corresponding to private information that is tampered by the program prior to being sent to the sink.

15. The computer system of claim 14, further comprising:
logic configured to prompt the user, via the graphical user interface presentation, to specify a privacy control decision as to whether actual data or anonymized data is provided by the flow to the sink, or whether the program is to be terminated; and
logic configured to receive the privacy control decision from the user.

16. The computer system of claim 15, further comprising logic configured to apply a default privacy control decision to the flow, and wherein said logic configured to prompt is configured to prompt the user to maintain or modify the default privacy control decision.

17. The computer system of claim 15, further comprising logic configured to invite a user to choose actual data for all identified flows or to choose anonymized data for all identified flows.

* * * * *